United States Patent
Matsubara et al.

(10) Patent No.: US 6,919,699 B2
(45) Date of Patent: Jul. 19, 2005

(54) MOTOR CONTROL APPARATUS

(75) Inventors: Shunsuke Matsubara, Yamanashi (JP); Shinichi Kono, Yamanashi (JP); Shinichi Horikoshi, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 49 days.

(21) Appl. No.: 10/462,709

(22) Filed: Jun. 17, 2003

(65) Prior Publication Data
US 2004/0227485 A1 Nov. 18, 2004

(30) Foreign Application Priority Data
Aug. 1, 2002 (JP) ........................................ 2002-224369

(51) Int. Cl.$^7$ ................................................. H02P 6/18
(52) U.S. Cl. .................. 318/254; 318/599; 318/628; 318/656; 341/143; 341/144; 375/238
(58) Field of Search ................................ 318/628, 656, 318/254, 721, 800, 722, 801, 439, 802, 808, 812; 324/225, 251; 341/143, 155; 369/47.38, 47.48; 375/238, 247; 332/109

(56) References Cited

U.S. PATENT DOCUMENTS

| | | | | |
|---|---|---|---|---|
| 5,319,291 A | * | 6/1994 | Ramirez ..................... | 318/254 |
| 5,345,236 A | * | 9/1994 | Sramek, Jr. ................. | 341/144 |
| 5,541,488 A | * | 7/1996 | Bansal et al. ............... | 318/801 |
| 5,585,708 A | * | 12/1996 | Richardson et al. ........ | 318/800 |
| 5,811,957 A | * | 9/1998 | Bose et al. .................. | 318/802 |
| 5,835,043 A | * | 11/1998 | Tsuchida et al. ............ | 341/143 |
| 5,859,510 A | * | 1/1999 | Dolan et al. ................ | 318/254 |
| 5,901,176 A | * | 5/1999 | Lewison ..................... | 375/238 |
| 5,933,453 A | * | 8/1999 | Lewison ..................... | 375/238 |
| 6,087,969 A | * | 7/2000 | Stockstad et al. ........... | 341/143 |
| 6,232,900 B1 | * | 5/2001 | Hendricks et al. .......... | 341/143 |
| 6,429,639 B1 | * | 8/2002 | Pelly ....................... | 324/117 H |
| 6,437,718 B1 | * | 8/2002 | Oyama et al. .............. | 341/143 |
| 6,448,725 B1 | * | 9/2002 | Cho et al. ................... | 318/254 |
| 6,788,233 B1 | * | 9/2004 | Quiquempoix et al. ..... | 341/143 |
| 2003/0020470 A1 | * | 1/2003 | Hatanaka .................... | 324/251 |

FOREIGN PATENT DOCUMENTS

| | | | | |
|---|---|---|---|---|
| JP | 05-344780 | 12/1993 | | |
| JP | 07-015972 | 1/1995 | | |
| JP | 7-015972 | 1/1995 | | |
| JP | 10-191678 | 7/1998 | | |
| JP | 2000-134909 | 5/2000 | | |
| WO | WO 3036787 A1 | * 5/2003 | ............. | H02P/6/18 |

* cited by examiner

*Primary Examiner*—Paul Ip
(74) *Attorney, Agent, or Firm*—Staas & Halsey LLP

(57) ABSTRACT

A magnetic flux produced by the current of a motor is detected by means of a Hall element, and an infinitesimal current proportional to the actual current of the motor is outputted. The outputted infinitesimal current is run through a resistor, and a potential difference across the resistor is detected by a $\Delta\Sigma$ modulator circuit. The motor is subjected to feedback control based on the potential difference detected by the $\Delta\Sigma$ modulator circuit.

8 Claims, 1 Drawing Sheet

MOTOR CONTROL APPARATUS

BACKGROUND OF THE INVENTION

1. Field of the Invention

The present invention relates to a motor control apparatus, and more particularly, to a motor control apparatus that detects the current of a motor and feeds back the detected motor current, thereby subjecting the motor to current feedback control.

2. Description of the Prior Art

In a generally known motor control method, the driving current of a motor is detected, and the motor is feedback-controlled so that the detected motor current value is equal to a command current value. In subjecting an inverter unit to PWM control to carry out current control, for example, driving currents for individual phases of the motor are detected, and PWM signals are originated so that the detected motor current values are equal to command current values for the individual phases. Based on the originated PWM signals, the inverter unit is regulated to control the motor currents for the individual phases.

In this motor control apparatus, a resistor is inserted in series in an electric conductor or output wire of the inverter unit through which the motor currents flow, and a potential difference across the resistor is detected, whereby the motor driving currents are detected. Described in Japanese Patent Application Laid-Open No. 7-15972 is a method in which detected motor currents are $\Delta\Sigma$—modulated so that they can be fed back accurately.

If a resistor for current detection is inserted in a circuit through which a current to drive the motor flows, in order to detect the actual current of the motor, it generates heat. If a high motor driving current is run, in particular, heat release from the resistor is substantial, so that the capacity of the resistor must be increased. Further, this heat release worsens the environment of installation of the motor and the motor control apparatus, e.g., the inverter unit, and exerts a bad influence upon peripheral apparatuses. If an attempt is made to feed back accurate driving currents by $\Delta\Sigma$ modulation by means of a $\Delta\Sigma$ modulator circuit, therefore, the effect of the $\Delta\Sigma$ modulation is reduced by half.

OBJECT AND SUMMARY OF THE INVENTION

The object of the present invention is to provide a small-sized, economical motor control apparatus that generates little heat.

A motor control apparatus according to the present invention comprises: a voltage output circuit for detecting a magnetic flux from the current of a motor by means of a Hall element and outputting voltage proportional to the actual current of the motor in accordance with the detected magnetic flux; and a $\Delta\Sigma$ modulator circuit for detecting the voltage delivered from the voltage output circuit. The motor is subjected to feedback control based on the voltage detected by the $\Delta\Sigma$ modulator circuit. Another motor control apparatus according to the invention comprises a circuit for detecting a magnetic flux from the current of a motor by means of a Hall element and outputting an infinitesimal current proportional to the actual current of the motor. The value of voltage produced across a resistor located in series at the output of the circuit is detected by means of a $\Delta\Sigma$ modulator circuit. The motor is subjected to feedback control based on the voltage detected by the $\Delta\Sigma$ modulator circuit.

The output of the $\Delta\Sigma$ modulator circuit is a one-bit digital signal to be processed by means of a digital filter. The output value of the $\Delta\Sigma$ modulator circuit is used for overcurrent detection. Further, the temperature of a Hall element mounting region is detected by means of temperature detecting means mounted near the Hall element, and the offset voltage of the Hall element is subjected to temperature drift compensation based on the temperature information. Furthermore, the output of the temperature detecting means is modulated by means of the $\Delta\Sigma$ modulator circuit.

DETAILED DESCRIPTION OF THE PREFERRED EMBODIMENTS

Figure 1:
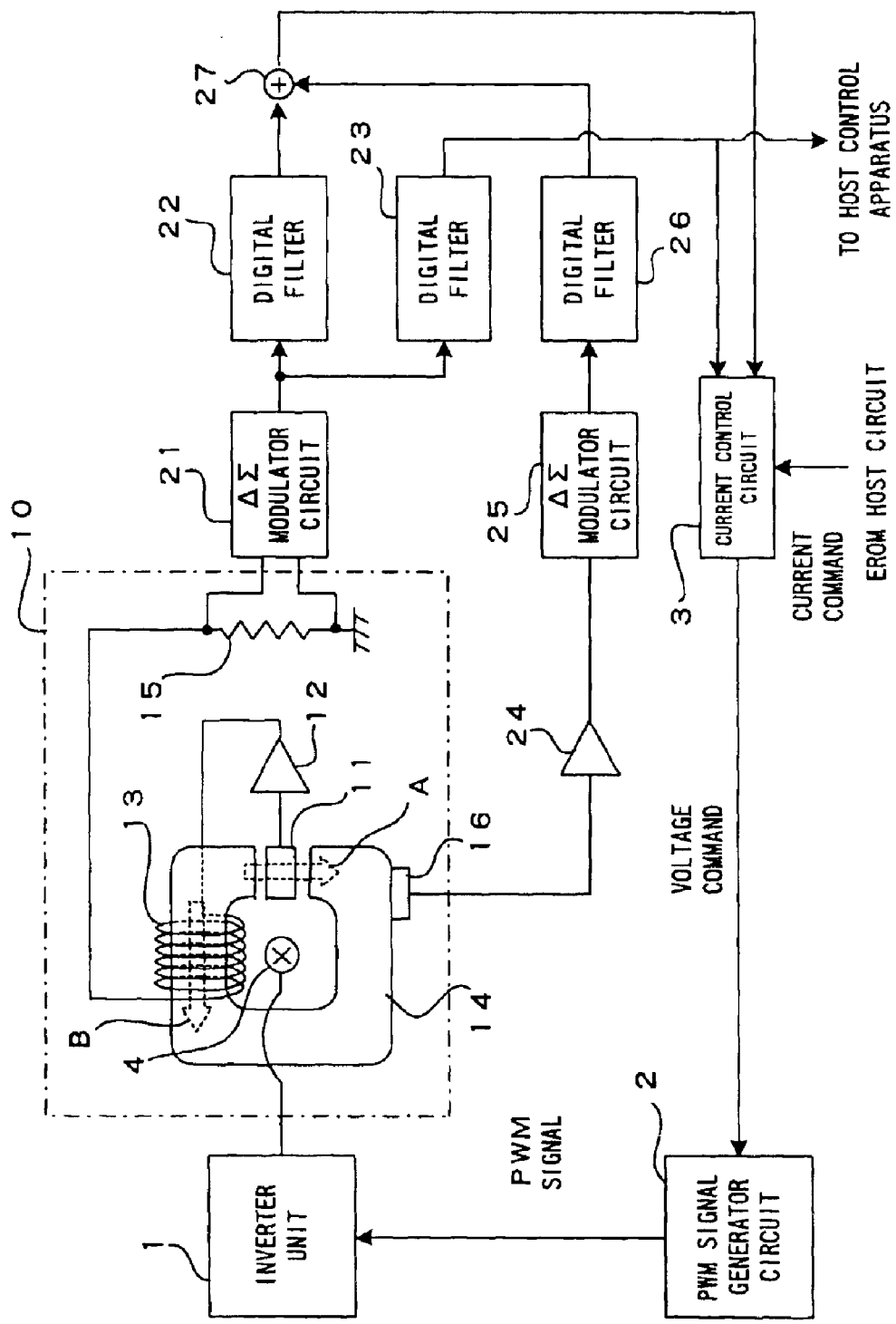
FIG. 1 is a diagram showing one embodiment of a motor control apparatus according to the present invention, of which the principal part is detailed.

FIG. 1 shows an example of a motor control apparatus for drivingly controlling an inverter unit with PWM signals. Instructed by a host circuit, such as a position and speed control circuit, or in accordance with command currents for individual phases and the actual current of a motor detected and fed back, a current control circuit 3 carries out current feedback control and delivers a voltage command to a PWM signal generator circuit 2. Normally, in subjecting a three-phase motor to three-phase current feedback control, phase current commands of two phases are applied to the current control circuit 3, and real-phase currents of these two phases are detected and fed back to the current control circuit 3. A phase current command and a real-phase current of the remaining phase are obtained in the current control circuit 3 in accordance with the phase current commands and real-phase currents of those two phases. Thus, the current control circuit 3 delivers voltage commands of the three phases to the PWM signal generator circuit 2.

Based on the voltage commands of the individual phases, the PWM signal generator circuit 2 generates a PWM signal for turning on or off a switching element of an inverter unit 1, thereby drivingly controlling the inverter unit 1. The motor is drivingly controlled by the output of the inverter unit 1.

For these particulars, the motor control apparatus of the present invention is constructed in the same manner as the conventional motor control apparatus that is based on PWM control. It is characterized in the technique for detecting the driving current of the motor.

In FIG. 1, reference numeral 4 denotes an electric conductor of one phase through which motor current delivered from the inverter unit 1 flows. A magnetic body 14 is located around the electric conductor 4. A magnetic flux that is generated by current that flows through the electric conductor 4 passes through the magnetic body 14. Thus, a magnetic flux path is formed in the magnetic body 14.

The magnetic body 14 is in the form of a tube that has a ring-shaped cross section. A part of the ring of the cross section is removed to form a gap. A Hall element 11 is located in this gap. An amplifier 12 is connected to the Hall element 11. The output of the amplifier 12 is connected to one end of a coil 13 that is wound around the magnetic body 14 so as to surround the magnetic flux path. The other end of the coil 13 is grounded through a resistor 15. The Hall element 11, amplifier 12, coil 13, magnetic body 14, and resistor 15 constitute a voltage output circuit 10 that detects the actual current of the motor, converts it into voltage, and outputs the voltage.

The value of voltage that is produced across the resistor 15 is applied to the input of a first ΔΣ modulator circuit 21. The output of the first ΔΣ modulator circuit 21 is applied to the respective inputs of first and second digital filters 22 and 23. The output of the output of the first digital filter 22 is applied to the input of an adder 27. The output of the second digital filter 23 is applied to the input of the current control circuit 3, and it is fed back to a machine that is provided with the motor and the like or a host control apparatus, such as a numerical control apparatus.

On the other hand, a temperature sensor 16 is located near the Hall element 11. In this embodiment, the sensor 16 is attached to that part of the magnetic body 14 which is situated near the Hall element 11. The output of the temperature sensor 16 is applied to a second ΔΣ modulator circuit 25 through an amplifier 24. The output of the second ΔΣ modulator circuit 25 is applied to the input of the adder 27 through a digital filter 26. Further, the output of the adder 27 is fed back to the current control circuit 3.

If the motor is actuated so that the motor current flows through the electric conductor 4, a magnetic flux is generated. This magnetic flux appears intensively in the magnetic body 14. In FIG. 1, arrow A represents the direction of the magnetic flux that is generated as the current flows through the electric conductor 4. This magnetic flux is detected by means of the Hall element 11 in the gap that is formed by partially removing the tubular magnetic body 14. The detection output of the Hall element 11 is amplified by the amplifier 12, and current is supplied to the coil 13 so as to cancel the magnetic flux. More specifically, the coil 13 is supplied with current such that a magnetic flux that has a direction (arrow B) opposite to the direction (arrow A) of the magnetic flux that is produced by the current that flows through the electric conductor 4 is formed in the magnetic body 14.

Thus, an infinitesimal current proportional to the motor current that flows through the electric conductor 4 flows through the resistor 15 that is connected to the coil 13. A voltage difference across the resistor 15 that is generated by the infinitesimal current is applied to the input of the first ΔΣ modulator circuit 21 and ΔΣ—modulated by the circuit 21. Thereupon, a one-bit digital signal that represents the motor current value is outputted. The outputted digital signal is cleared of quantizing noise and the like by means of the first and second digital filters 22 and 23.

A one-bit digital signal output of the second digital filter 23 is fed back to the current control circuit 3 and the host control apparatus and utilized for overcurrent detection. Thus, if the motor current that is represented by the digital signal from the second digital filter 23 is concluded to be an overcurrent by an overcurrent detector circuit in the current control circuit 3, the output (voltage command) of the circuit 3 is stopped. The host control apparatus gives an alarm or the like if the overcurrent is identified by the level of the motor current that is represented by the signal from the second digital filter 23.

On the other hand, the output of the first digital filter 22 is applied to the input of the adder 27. Further, the output of the temperature sensor 16 is amplified by the amplifier 24, ΔΣ—modulated and converted into a one-bit digital signal by the ΔΣ modulator circuit 25, and applied to the input of the adder 27 through the third digital filter 26.

The adder 27 adds the output (i.e., signal indicative of temperature near the Hall element 11 detected by the temperature sensor 16) of the third digital filter 26 to the output (i.e., signal indicative of the motor current value based on the magnetic flux detected by the Hall element 11) of the first digital filter 22, thereby subjecting the offset voltage of the Hall element 11 to temperature drift compensation. After undergoing the temperature drift compensation, the ΔΣ—modulated one-bit digital signal that is indicative of the detected motor current value is fed back to the current control circuit 3.

As mentioned before, the current control circuit 3 carries out current feedback control in accordance with a feedback signal indicative of the detected motor current value and the current commands from the host circuit or the position and speed control circuit, and delivers the voltage commands to the PWM signal generator circuit 2. Based on these voltage commands, the PWM signal generator circuit 2 generates and outputs the PWM signal for turning on or off the switching element of the inverter unit 1, thereby drivingly controlling the inverter unit 1. Thus, the driving current is supplied to each phase of the motor to drive the motor.

The magnetic flux that is produced by the motor current is detected by means of the Hall element 11. The current that is caused to flow through the coil 13 and the resistor 15 by the detected magnetic flux is an infinitesimal current that is proportional to and lower than the motor current. Therefore, the resistor 15 may be a small-capacity one that generates little heat. The value of the voltage across the resistor 15 is modulated and converted into a one-bit digital signal by the ΔΣ modulator circuit 21, cleared of quantizing noise and the like by means of the digital filters, and fed back as an actual current detection feedback signal to the current control circuit 3. Accordingly, an accurate feedback signal that represents the actual current can be obtained, so that the motor control apparatus can be a small-sized, economical one. Further, the digital signal that is modulated by means of the ΔΣ modulator circuit 21 is an unweighted one-bit digital signal. If the signal is subject to noise or the like in the feedback path, therefore, it cannot be a substantially wrong signal. Thus, an accurate current detection signal that resists noise can be fed back.

According to the present invention arranged in this manner, there may be provided a small-sized, economical motor control apparatus that generates little heat.

What is claimed is:

1. A motor control apparatus comprising:
   a voltage output circuit detecting a magnetic flux from the current of a motor by using a Hall element and outputting a voltage proportional to the actual current of the motor in accordance with the detected magnetic flux; and
   a ΔΣ modulator circuit detecting the voltage delivered from the voltage output circuit,
   the motor being subjected to feedback control based on the voltage detected by the ΔΣ modulator circuit.

2. A motor control apparatus comprising:
   a circuit detecting a magnetic flux from the current of a motor by using a Hall element and outputting an infinitesimal current proportional to the actual current of the motor; and
   a ΔΣ modulator circuit detecting the value of voltage produced across a resistor located in series at the output of the circuit,
   the motor being subjected to feedback control based on the voltage detected by the ΔΣ modulator circuit.

3. The motor control apparatus according to claim 1, wherein the output of the ΔΣ modulator circuit is a one-bit digital signal to be processed by a digital filter.

4. The motor control apparatus according to claim 1, wherein the output value of the ΔΣ modulator circuit is used for overcurrent detection.

5. The motor control apparatus according to claim 1, wherein the temperature of a Hall element mounting region is detected by temperature detecting means mounted near the Hall element, and the offset voltage of the Hall element is subjected to temperature drift compensation based on the temperature information.

6. The motor control apparatus according to claim 5, wherein the output of the temperature detecting means is modulated by the $\Delta\Sigma$ modulator circuit.

7. An apparatus for providing a motor measurement to a motor control circuit comprising:
   a magnetic body electrically coupled with current flowing to the motor;
   a flux measurer that measures flux flowing through the magnetic body;
   a magnetic body flux canceller coupled to the flux measurer;
   a resistor coupled with the magnetic body flux canceller and the flux measurer; and
   an output that provides the voltage across the resistor to the motor control circuit.

8. A motor control apparatus comprising:
   a voltage output circuit detecting a magnetic flux from the current of a motor by using a Hall element and outputting a voltage proportional to the actual current of the motor in accordance with the detected magnetic flux; and
   a modulator circuit detecting the voltage delivered from the voltage output circuit, the motor being subjected to feedback control based on the voltage detected by the modulator circuit.

* * * * *